Jan. 16, 1951     R. J. DAMES, JR     2,537,971
INSTRUMENT ILLUMINATION

Filed Dec. 19, 1944     2 Sheets—Sheet 1

Inventor

RALPH J. DAMES JR.

By Ralph L. Chappell
Attorney

Jan. 16, 1951  R. J. DAMES, JR  2,537,971
INSTRUMENT ILLUMINATION
Filed Dec. 19, 1944  2 Sheets-Sheet 2
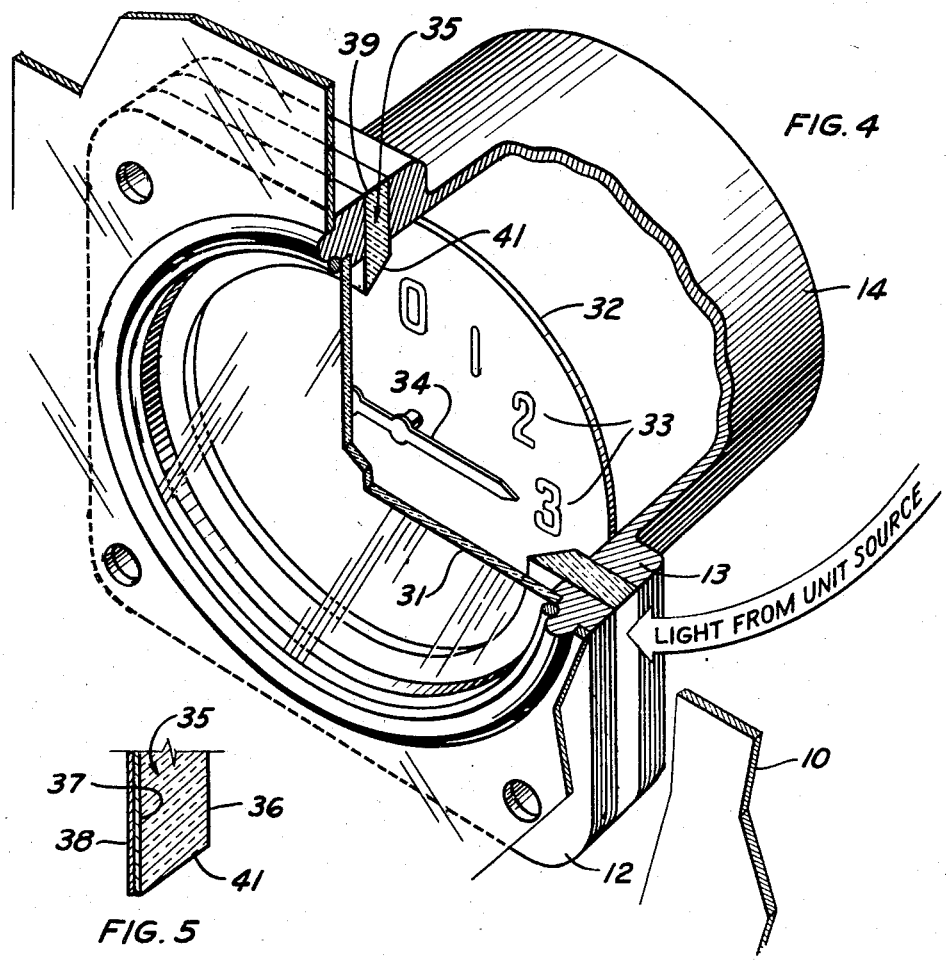
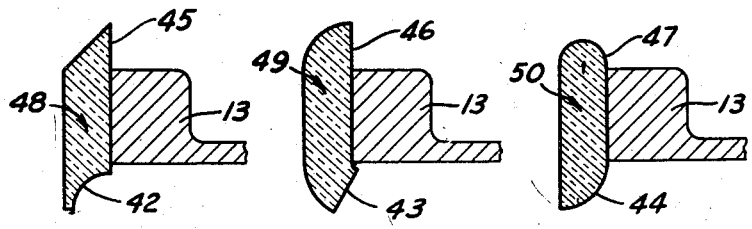
Inventor
RALPH J. DAMES JR.
By Ralph L. Chappell
Attorney Patented Jan. 16, 1951

2,537,971

UNITED STATES PATENT OFFICE 2,537,971

INSTRUMENT ILLUMINATION

Ralph J. Dames, Jr., United States Navy

Application December 19, 1944, Serial No. 568,917

8 Claims. (Cl. 240—8.16)

(Granted under the act of March 3, 1883, as amended April 30, 1928; 370 O. G. 757)

The present invention concerns means for illuminating instrument panels. While it is capable of use in numerous applications, it is particularly well-suited to the illumination of vehicle instruments, and is described as applied to the instrument panel of an aircraft.

The ever-increasing number of aircraft instruments carried by a modern military plane gives rise to new problems of illumination, since if conventional illuminating methods are applied to a multiplicity of instruments the installation becomes quite complex, presenting serious problems of construction and maintenance. In addition, present illumination methods have not shown themselves to be entirely satisfactory in providing good visibility of the instrument dials without objectional glare.

One of the prime objects of the present invention is to provide means for illuminating a plurality of instruments, said means having advantages of efficiency and simplicity as compared with previous arrangements.

Another important object resides in the provision of a novel illuminating system for instrument panels wherein a multiplicity of instruments are illuminated by a common light source and in which alternate light sources can be utilized to provide the illuminating characteristics desired.

More specifically, the practice of the principles of this invention provides a means whereby all of the instruments of a panel can be illuminated selectively, either by white light under normal conditions of operations, or by red light under conditions where it is necessary to maintain night adaptation of the pilot's vision. It is also contemplated that other visible or invisible frequencies such as fluorescent lighting and ultra-violet rays can be used in special applications.

A further object resides in the provision of a simplified instrument-lighting arrangement utilizing a plurality of unit light sources, each common to all of the instruments, so that any one of the light sources serves to illuminate all of the instruments in the event that another unit source fails.

A further object resides in the provision of a relatively large and rugged light source having a greater degree of resistance to shock and vibration than the multiple miniature sources used customarily, together with a light reflecting chamber to distribute the light to a multiplicity of independent instrument dials.

A further object resides in the provision of a light-reflecting chamber and sources of illumination arranged and positioned to facilitate replacement of the unit sources when necessary.

The foregoing objects are accomplished by the provision of a light-reflecting chamber behind an instrument panel, together with a number of light sources, each common to all of the instruments, and illuminating elements associated with each of the instruments whereby light from the chamber is transmitted to the individual instrument dials.

Further objects and advantages of this invention, as well as its construction, arrangement and operation, will be apparent from the following description and claims in connection with the accompanying drawings, in which Fig. 1 is a schematized front elevational view of an instrument panel constructed in accordance with the teachings of this disclosure;

Fig. 4 is a fragmental perspective view of a typical instrument case and dial showing the position of the light-transmitting element;

Fig. 5 is an enlarged fragmental detail section of the light-transmitting element shown in Fig. 4; and Figs. 6, 7 and 8 are fragmental detail sectional views of modified forms of the light-transmitting elements.

Figure 1:
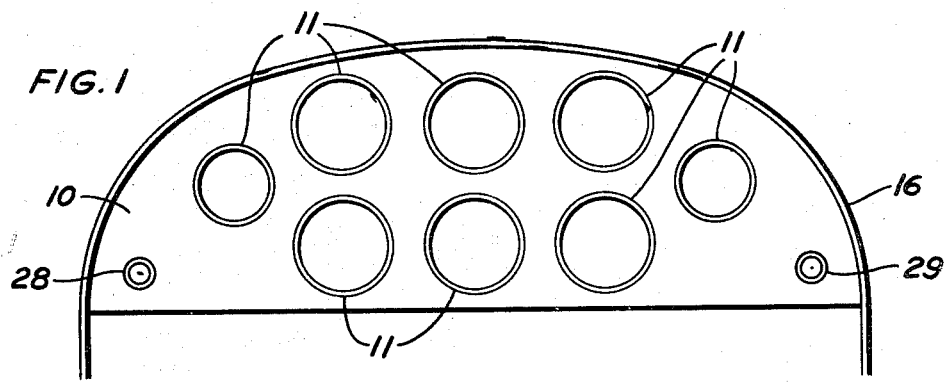

The instrument panel 10 can be of any convenient size and shape and is adapted to support a number of separate individual instruments 11. These instruments can be considered as representative of any of the flight instruments of an aircraft. Customarily, the several instruments 11 are mounted on the instrument panel by means of a mounting ring or plate 12 and a flange 13 on the case 14 of each of the individual instruments. Thus the front face of each of the various instruments lies in approximately the same plane and the various different sizes and shapes of instrument cases project to the rear of the panel.

Figure 2:
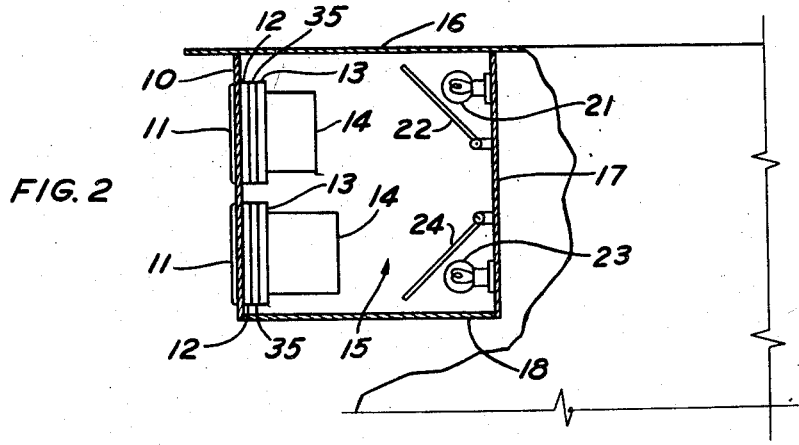
Fig. 2 is a central transverse sectional view of the panel illustrated in Fig. 1.

In practicing the teachings of this invention it is contemplated that the rear surface of the panel 10 be enclosed completely to form a light chamber 15. In Fig. 2 the light chamber 15 is illustrated as comprising the upper cowling 16, the bulkhead 17 forward of the panel 10, and a removable bottom panel 18 at the lower edge of the panel 10. The cowling 16 is curved so that its opposite sides extend downwardly to meet the bottom panel 18 and thus enclose the chamber 15 at the sides as well as at the ends. The panel 18 is secured by latches (not shown) so that it can be removed easily to provide access to the light source or to the instruments.

Figure 3:
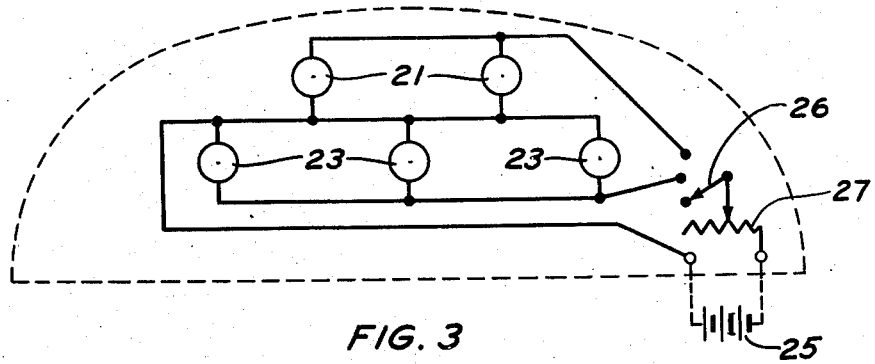
Fig. 3 is a diagrammatic view of the light sources associated with the panel and the electrical control circuit by which they are energized.

The light chamber 15 can be provided with one or more light sources but the best results are obtained by providing a plurality of unit sources of each of two or more different types. A typical example utilizes a pair of clear incandescent lamps 21 mounted on the bulkhead 17 behind a diffusing screen 22, together with a plurality of colored lamps 23 mounted similarly behind the screen 24. The exact arrangement of the lamps can be varied as desired, but they are illustrated in Fig. 3 as being spaced apart with respect to each other. The screens 22 and 24 are hinged to permit easy access to the lamps when necessary for replacement.

The lamps are energized from any convenient source 25, and a switch 26 permits the selection of the clear or colored lamps, according to the choice of the pilot. Similarly, the intensity of the illumination is controlled by the pilot by manipulating the rheostat 27. If desired, the switch 26 can be controlled by a knob 28 on the instrument panel and the rheostat 27 controlled similarly by a knob 29.

The interior surface of the light chamber 15 serves to reflect light emanating from the unit sources so that it will become well diffused, and can be picked up by the light-transmitting elements associated with each instrument.

It is contemplated that best results are obtained by providing the surface within the interior of the chamber 15 with reflective coatings. These coatings can also be applied to the exterior surface of the instrument cases 14 to aid in reflecting and diffusing the light rays.

Each individual instrument on the panel includes a lens 31, dial 32, dial indicia 33 and indicating means 34 in addition to the mounting ring 12, flange 13 and case 14 heretofore mentioned. The present invention contemplates that these conventional instrument parts shall be modified by the provision of an illuminating element for each of the individual instrument dials and, in the form of the invention illustrated, this illuminating element comprises a marginal light-transmitting section 35 surrounding the instrument dial 32 entirely and positioned between the instrument dial and the instrument lens. The section 35 can be clamped between the mounting ring 12 and the flange 13 so that the inner edge projects inwardly adjacent the dial and the outer edge extends outwardly to or beyond the edge of the flange 13, so that it will pick up light from the lamps 21 and 23, after the light has been reflected from the interior surfaces of the light chamber and thus diffused so that it will enter all sides of the light transmitting section. The transmitting section 35 can be of any transparent or translucent material but best results have been obtained by the use of clear plastic material such as methyl acrylate or polymerized methyl methacrylate, known in the trade as "Plexiglass" or "Lucite." The characteristics of light transmission inherent in plain sheet plastic are improved by providing an opaque reflecting coating on the flat surface of the light transmitting section. This coating can be applied on both sides if desired, but highly satisfactory results are obtained by leaving the surface 36 adjacent the dial uncoated and applying a reflecting silver coating 37 on the opposite face. The silver coating 37 is in turn covered by a black opaque coating 38.

From the foregoing it will be apparent that when any one of the unit sources of light within the chamber 15 is energized, the light is reflected back and forth between the interior surfaces of the chamber and is diffused effectively behind the several instruments. Thus the outer marginal edge 39 of the section 35 acts as a light-collecting edge to pick up the light rays and transmit them inwardly to the interior light-diffusing edge 41, from which the rays reach the indicia 33 on the dial and permit observation of the indicating means 34 through the lens.

Reasonably satisfactory results can be had by almost any formation of the inner edge of the transmitting section, but most satisfactory results are obtained by beveling the edge as illustrated at 41 in Fig. 5 or shaping it as indicated at 42, 43 and 44 in Figs. 6, 7 and 8, respectively. In addition, it can be frosted or roughened to further diffuse the light rays.

Satisfactory light-collecting properties are achieved with the form of light-collecting edge indicated at 39 in Fig. 4, but under certain conditions it is desirable to extend the outer edge of the section beyond the mounting flange of the instrument case and bevel and curve the edge in the manner illustrated at 45, 46 and 47 in the sections 48, 49 and 50, shown in Figs. 6, 7 and 8.

Thus, although Fig. 4 illustrates the most generally applicable arrangement, the invention is capable of the modifications illustrated and also capable of various other modifications and variations coming within the general scope of the inventive thought. It is accordingly requested that the exact forms of the invention illustrated be regarded as illustrative rather than as limitations and that the scope of the inventive thought be determined by the language of the claims.

The invention described herein may be manufactured and used by or for the Government of the United States of America for governmental purposes without the payment of any royalties thereon or therefor.

I claim:

1. The combination, with an instrument panel, of a light chamber associated with said panel, a plurality of instruments mounted on said panel with their faces substantially flush with said panel and their cases projecting into said chamber, each of said instruments including a dial, indicating means and a lens, an annular illuminating element of light-transmitting material positioned between the lens and the dial of the instrument, said element having an external edge exposed to the light rays of the chamber, and an internal edge for diffusing the light over the face of the dial, a light source positioned in said chamber and behind said instruments, and means for diffusing light from said source at substantially equal intensity over the entire periphery of each of said illuminating elements.

2. The combination, with an instrument panel, of a light chamber associated with said panel, the chamber including a plurality of light-reflecting surfaces, a plurality of instruments mounted on said panel, each of said instruments including a dial, indicating means and a lens, an annular illuminating element of light-transmitting material positioned between said lens and said dial, said element having an internal light-diffusing edge adjacent the marginal edges of the dial and an external light-collecting edge exposed to the light rays of said chamber, a light source positioned in said chamber and behind said instruments, said light-reflecting surfaces being positioned to transmit light over the entire external edge of each of said illuminating elements, and light-diffusing screens carried in said chamber between said light source and said surfaces.

3. In an instrument including a case, a dial, indicating means and a lens, the combination of an illuminating element having a light-transmitting section consisting of a flat transparent plastic sheet positioned between said lens and said dial and extending beyond said case, whereby light from the exterior of the case is transmitted to the dial, said section having a central opening approximating the dimensions of said dial, an internal light-diffusing edge adjacent the marginal edges of said dial, an external light-collecting edge adjacent the outer surface of said case, a light source positioned behind said case, and a diffusing screen carried between said light source and said section for diffusing light from said source at substantially equal intensity over the entire light-collecting edge of said section.

4. The combination, with an instrument panel, of a plurality of instruments mounted on said panel, each of said instruments having a dial, indicating means and a lens, a light chamber carried by said panel and partially surrounding said instruments, an annular illuminating element of light-transmitting material positioned between said lens and said dial, said element having an external edge exposed to the light rays of said chamber and an internal edge for diffusing light passing through said element over the face of said dial, said chamber having reflecting interior surfaces adapted to reflect light rays against said external edge, and means to illuminate the interior of said chamber, said means being positioned in said chamber behind said instruments.

5. The combination, with an instrument panel, of a light chamber associated with said panel, a plurality of instruments mounted on said panel with their faces substantially flush with said panel and their cases projecting into said chamber, each of said instruments including a dial, indicating means and a lens, an annular illuminating element of light-transmitting material positioned between the lens and the dial of the instrument, said element having an external edge exposed to the light rays of the chamber and an internal beveled edge for diffusing the light over the face of the dial, a light source positioned in said chamber and behind said instruments, and means for diffusing light from said source at substantially equal intensity over the entire periphery of each of said illuminating elements.

6. The combination, with an instrument panel, of a light chamber associated with said panel, a plurality of instruments mounted on said panel with their faces substantially flush with said panel and their cases projecting into said chamber, each of said instruments including a dial, indicating means and a lens, an annular illuminating element of light-transmitting material positioned between the lens and the dial of the instrument, said element having an external bev-eled edge exposed to the light rays of the chamber and an internal concave edge for diffusing the light over the face of the dial, a light source positioned in said chamber and behind said instruments, and means for diffusing light from said source at substantially equal intensity over the entire periphery of each of said illuminating elements.

7. The combination, with an instrument panel, of a light chamber associated with said panel, a plurality of instruments mounted on said panel with their faces substantially flush with said panel and their cases projecting into said chamber, each of said instruments including a dial, indicating means and a lens, an annular illuminating element of light-transmitting material positioned between the lens and the dial of the instrument, said element having an external convex edge exposed to the light rays of the chamber and an internal beveled edge for diffusing the light over the face of the dial, a light source positioned in said chamber and behind said instruments, and means for diffusing light from said source at substantially equal intensity over the entire periphery of each of said illuminating elements.

8. The combination, with an instrument panel, of a light chamber associated with said panel, a plurality of instruments mounted on said panel with their faces substantially flush with said panel and their cases projecting into said chamber, each of said instruments including a dial, indicating means and a lens, an annular illuminating element of light-transmitting material positioned between the lens and the dial of the instrument, said element having an external rounded edge exposed to the light rays of the chamber and an internal convex edge for diffusing the light over the face of the dial, a light source positioned in said chamber and behind said instruments, and means for diffusing light from said source at substantially equal intensity over the entire periphery of each of said illuminating elements.

RALPH J. DAMES, Jr.

REFERENCES CITED

The following references are of record in the file of this patent:

UNITED STATES PATENTS

| Number | Name | Date |
|---|---|---|
| 1,646,763 | Murray et al. | Oct. 25, 1927 |
| 1,739,954 | Du Pont | Dec. 17, 1929 |
| 1,976,270 | Urfer | Oct. 9, 1934 |
| 2,131,471 | Carter | Sept. 27, 1938 |
| 2,140,925 | Schlenker | Dec. 20, 1938 |
| 2,140,972 | Rylsky | Dec. 20, 1938 |
| 2,214,595 | Rights | Sept. 10, 1940 |
| 2,259,910 | Rylsky | Oct. 21, 1941 |
| 2,317,182 | Dickson et al. | Apr. 20, 1943 |
| 2,337,746 | Garstang | Dec. 28, 1943 |
| 2,413,848 | Simpson | Jan. 7, 1947 |

FOREIGN PATENTS

| Number | Country | Date |
|---|---|---|
| 247,423 | Great Britain | Feb. 18, 1926 |
| 314,608 | Germany | of 1919 |
| 512,295 | Great Britain | Aug. 31, 1939 |